March 12, 1963     G. D. WINTER     3,081,158
LIQUID TREATMENT APPARATUS
Filed Dec. 28, 1959     3 Sheets-Sheet 1

INVENTOR.
GEORGE D. WINTER
BY Harry Cole
ATTORNEY

March 12, 1963  G. D. WINTER  3,081,158
LIQUID TREATMENT APPARATUS
Filed Dec. 28, 1959  3 Sheets-Sheet 2

INVENTOR.
GEORGE D. WINTER
BY
ATTORNEY

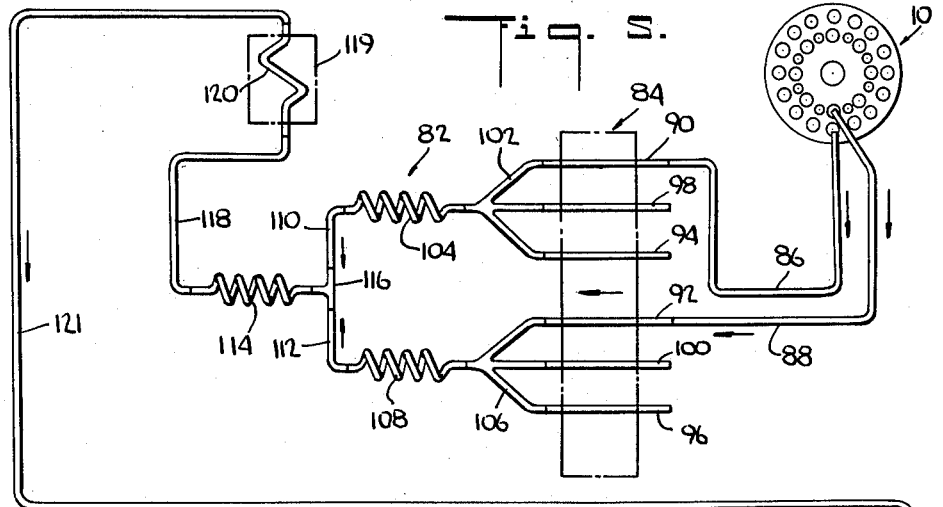
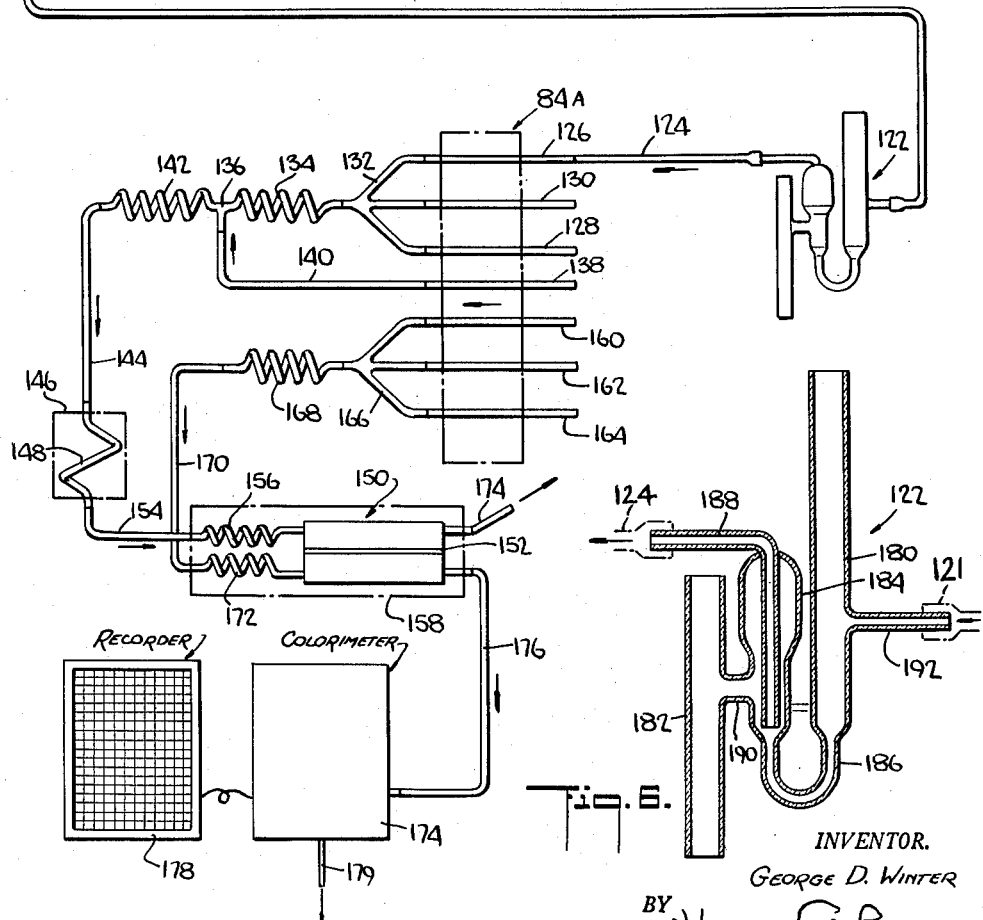

United States Patent Office 3,081,158
Patented Mar. 12, 1963

3,081,158
LIQUID TREATMENT APPARATUS
George D. Winter, Croton-on-Hudson, N.Y., assignor to Technicon Instruments Corporation, Chauncey, N.Y., a corporation of New York
Filed Dec. 28, 1959, Ser. No. 862,111
3 Claims. (Cl. 23—253)

This invention relates to the continuous treatment of materials for analysis or other processing and, more particularly, to a method and system for the continuous treatment of a material with a substance or reagent whose action is inhibited by the material or an ingredient thereof in an amount proportional to the quantity of the material or the ingredient present for determining said quantity or for some other purpose.

While useful for other purposes, the method and apparatus of the present invention is especially useful in the analysis of plant material or other kinds of material which contain toxic agents or residues that inhibit or inactivate the action of the enzyme cholinesterase, the degree of such inhibition being indicative of the presence and quantity of the substance or residue. More particularly, in accordance with one object of the invention, automatic means and a method are provided for continuous determinations of the residue of an insecticide or pesticide in plant material utilizing a cholinesterase bio-assay procedure.

Another object of the invention is the provision of means having a plurality of sets of liquid containers and operable automatically in conjunction with a plurality of companion liquid take-off devices for supplying a plurality of liquids from companion containers of the different sets, respectively, to liquid processing apparatus.

Another object is the provision of liquid supply apparatus of the above indicated type with means for supplying to the processing apparatus a cleansing fluid from one of the sets of the liquid containers to the passages through which liquid from another set of said containers is transmitted to the processing apparatus.

Another object is to provide a method and means for treating a material or an ingredient thereof with a substance or reagent capable of being inhibited or inactivated by said material or ingredient and determining the degree of inactivation of said reagent as a measure of the quantity of the material or ingredient, or for some other purpose.

A further object is generally to provide an improved method and means for analyzing, treating, or processing certain fluids.

The above and other objects, features and advantages of this invention will be fully understood from the following description considered in connection with the accompanying illustrative drawings of the presently preferred embodiment of this invention.

In the drawings:

FIG. 5 is a more or less diagrammatic view illustrating the processing apparatus or system and method of the present invention; and FIG. 6 is a liquid supply device utilized in the apparatus of FIG. 5.

Briefly described, pursuant to the invention a liquid supply apparatus is provided which includes a holder having concentric inner and outer rows of receptacles. The outer receptacles contain sample solutions of the material which is to be treated for analysis or for some other purpose. The inner receptacles contain solutions of a reagent which is inhibited or inactivated in proportion to the quantity of the material samples or an ingredient thereof present. The holder is intermittently rotated past a liquid intake device which simultaneously and successively aspirates portions of the sample and the reagent from their respective receptacles. The aspirated sample and reagent are formed into individual streams, respectively, and the sample stream is segmentized with an inert gas and mixed with a bromine water solution which increases the sensitivity of the analysis or treatment. The reagent stream is also segmentized with an inert gas and mixed with a buffer solution which helps maintain the pH of the various fluids during flow through the system.

The segmentized streams of buffered reagent and sample with bromine are each simultaneously transmitted to a helical mixing coil where corresponding parts of each of the streams join and mix with each other to form a stream consisting of liquid segments containing the sample, the reagent, the buffer solution, and the bromine solution separated from each other by intervening segments of the inert gas. From the mixer the segmented stream is transmitted to a temperature controlled heating bath wherein the inactivating or inhibiting action of the sample on the reagent occurs. From the heating bath the reacted stream containing the inhibited and uninhibited portions of reagent is transmitted to a liquid supply device from which an aliquot of the liquid containing the inhibited and uninhibited reagent is aspirated as a liquid stream and transmitted from said device for further treatment for colorimetric analysis or other processing.

The liquid stream from the liquid supply device is segmentized and mixed with a reagent and then transmitted to a temperature controlled heating bath wherein the uninhibited portion of reagent reacts with the added reagents to form a reaction product which is indicative of the quantity of the ingredient of the sample being treated. From the heating bath the stream containing the reaction product is transmitted to one side of the membrane of a dialyzer and, concurrently with said transmission, a segmented recipient stream containing a color reagent is transmitted to the dialyzer, at the other side of the membrane thereof. A portion of the reaction product diffuses through the membrane into the recipient stream containing the color reagent to form a diffusate stream which is transmitted to a colorimeter. The colorimeter operates a recorder for indicating the quantity of the material or ingredient thereof present in the sample.

Figure 1:
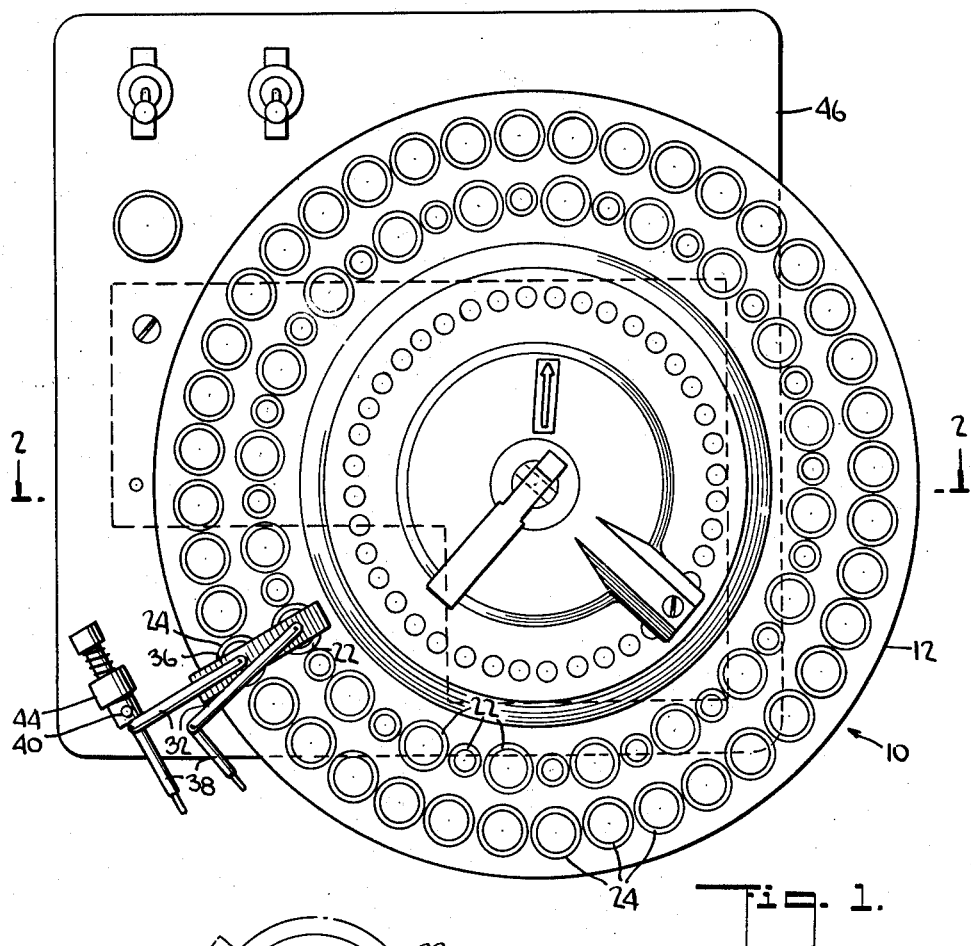
FIG. 1 is a plan view of a liquid supply apparatus pursuant to the invention.

Referring now to the drawings in detail and particularly to FIGS. 1 through 4, the liquid sample supply or feed apparatus 10 is of the type shown and described in U.S. Patent No. 3,038,340, issued June 12, 1962. In accordance with the present invention, the feed apparatus comprises a holder 12 having provision for holding a plurality of individual samples of material and a plurality of individual portions of a processing liquid or reagent. The holder is constituted by a circular plate provided with a circular inner row of apertures 14 and a concentric outer row of apertures 16 (see FIG. 4), each of the apertures being on radial extending lines with a corresponding pair of apertures 14, 16 being on the same radial line. As best shown in FIG. 1, the apertures of the inner row are constituted by alternate larger and smaller diameter apertures, respectively, so that the same number of apertures is provided in the inner row as is provided in the outer row. It will be understood that a corresponding pair of apertures 14, 16 need not be on the same radial line but may be arranged otherwise than as shown herein.

Figure 4:
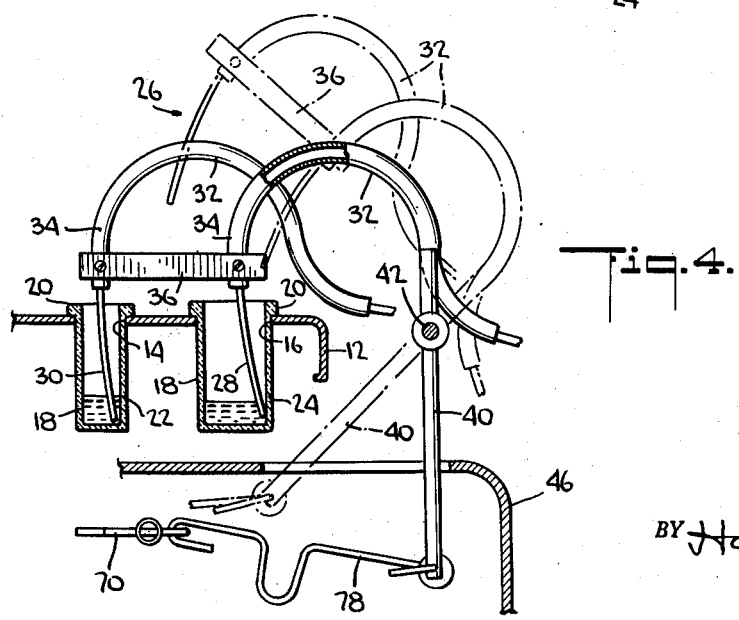
FIG. 4 is a fragmentary sectional view taken on line 4—4 of FIG. 3, on a larger scale.

As best seen in FIG. 4, each of the apertures is adapted to hold an open top receptacle or container 18, and each container is provided with a rim or shoulder 20 for supporting the container in its corresponding aperture in the holder 12. Alternate containers of the inner row of containers 22 are adapted to contain a processing liquid or reagent and the containers between each of the reagents may contain a wash liquid, for example water. Alternate containers of the outer row of containers 24 contain the samples being treated and the containers between said samples also may contain a wash liquid, for example ethyl alcohol.

The holder 12 is adapted to be intermittently and successively rotated to simultaneously carry a pair of containers 24, 22 past a liquid take-off device 26, which is laterally offset from the outer row of containers. The take-off device 26 is adapted to be pivoted through precipitous back and forth intake strokes successively into and out of the pair of containers 24, 22 for simultaneously withdrawing portions of the liquids contained therein, through take-off tubes 28 and 30, respectively.

Tubes 28 and 30 are snaked through rigid tubular members or sleeves 32, respectively, which are downwardly curved, as at 34, to provide curvatures in the tubes 28 and 30, respectively, conforming to sleeves 32, so that the inlet ends of the tubes are always disposed at a corner of the containers 24 and 22, respectively, as shown in FIG. 4. Sleeves 32 are connected to each other by a rigid bar 36 so that the inlet tubes 28 and 30 move together as a unit. As best seen in FIG. 1, each of the sleeves has an outward curvature 38, substantially at right angles to the curved part 34, and the take-off tubes extend from said curved portions and are connected to a pump for the withdrawal of the liquids from the receptacles.

As fully described in the aforementioned U.S. patent, a tubular member 32 is secured to a support 40, but as shown in FIGS. 1 and 4 herein, pursuant to the invention, the other tubular member is secured to bar 36. Support 40 is mounted on a pivot 42 which is mounted on a post 44 secured to the housing 46 of the apparatus. Provision is made to retract the take-off tubes 28 and 30 from the containers 24 and 22, respectively, in which they are inserted, immediately prior to the start of the intermittent rotation of the holder 12 and to return the take-off tubes to the following pair of containers 24, 22 as soon as they are in position. These movements of the take-off tubes are constituted by relatively precipitous reciprocatory motions to provide sharp introductions and sharp breaks of the tubes with respect to the liquids in the containers.

Figure 3:
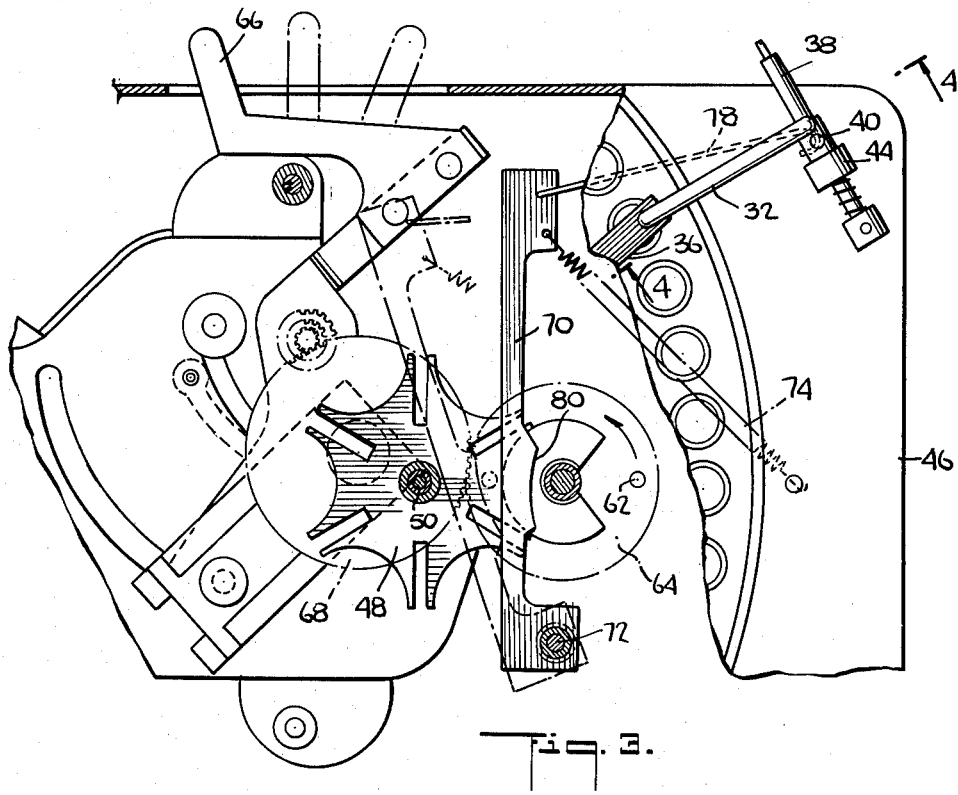
FIG. 3 is a plan view taken on line 3—3 of FIG. 2, with parts broken away for purposes of illustration.
Figure 2:
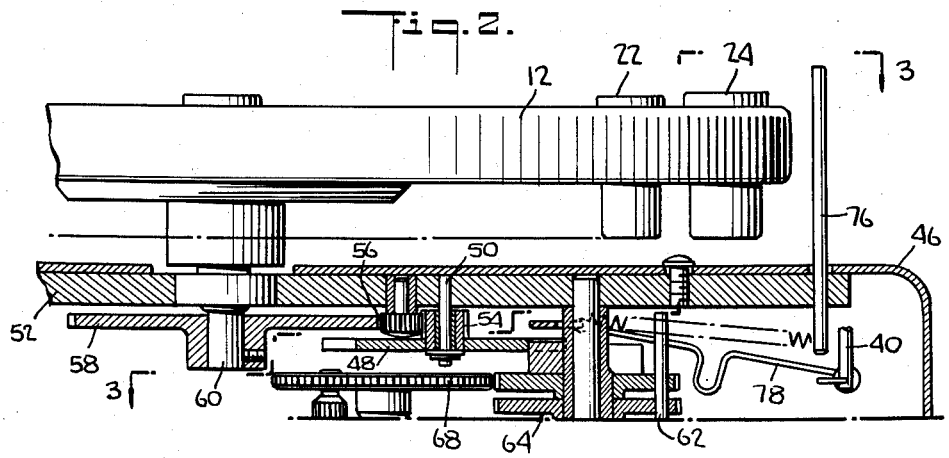
FIG. 2 is a sectional view taken on line 2—2 of FIG. 1, on a larger scale, with parts broken away or omitted for purposes of illustration.

In order to effect the indicated intermittent rotation of the container holder 12, as well as the pivotal movements of the tubes 28 and 30, as shown herein in FIGS. 2 and 3, and as fully described in the aforesaid patent, a Geneva gear 48 is mounted on a shaft 50 which is secured to a plate 52 of housing 46. A pinion gear 54 is mounted for rotation on shaft 50 and Geneva gear 48 is secured to said pinion gear. Gear 54 is in mesh with an intermediate gear 56 which is in mesh with a driven gear 58 and said gear 58 is secured to a drive shaft 60 to which the holder 12 is secured for intermittent rotation.

The driver for Geneva gear 48 is constituted by a pin 62 which projects upwardly from a set of stacked gears 64 which is part of a speed change mechanism operated by the lever 66 shown in FIG. 3. An electric motor, not shown, turns a gear 68 which meshes with one of the stacked gears 64, depending upon the vertical position of gear 68, as set by the operation of lever 66, to drive pin 62 which drives the Geneva gear 48 for intermittently rotating the holder 12.

The pivotal movements of the take-off tubes 28 and 30 are also effected by the operation of pin 62. More specifically, a cam member 70 is pivotally mounted at 72, at one end thereof, and the free end of the cam member is interconnected by the tension spring 74 with the lower end of a pin 76 which is secured to plate 52. A wire link 78 interconnects the free end of cam member 70 and the lower end of the support 40. With the cam member 70 in the full line position shown in FIG. 3, the take-off tubes 28 and 30 are in their respective containers, as shown in the full line position of FIG. 4. With the cam member in the retracted or broken line position shown in FIG. 3, the take-off tubes are pivoted to the retracted or broken line position shown in FIG. 4, wherein the tubes are withdrawn from their respective containers during the rotational movement of the holder 12.

Cam member 70 is provided with an arcuate portion 80, and with the stacked gears rotating counterclockwise, as viewed in FIG. 3, it will be seen that before pin 62 engages a slot in the Geneva gear 48 to rotate holder 12, the pin will first strike the cam member, which is in the path of movement thereof, and pivot said cam member from the full to the broken line position thereof, with the pin riding along the arcuate portion 80 during the period that it remains engaged in a slot in said Geneva gear 48. The movement of the cam member results in a sharp or precipitate retraction of the tubes 28 and 30 from their inserted positions in their respective containers and the tubes are retained in their retracted positions during the rotation of the holder 12. When the pin disengages the slot of the Geneva gear at the termination of the intermittent rotation of said Geneva gear and the holder 12, the pin will permit the cam member 70 to return to its normal position under the biasing action of spring 74, wherein the take-off tubes will be inserted into a succeeding pair of containers in a like precipitate manner.

Referring now to FIGURE 5, there is shown an analysis or processing apparatus or system 82 utilizing the liquid supply apparatus 10, just described, wherein a material which has an inhibiting effect on another substance or reagent may be treated for analysis or other processing to determine the quantity of the material or an ingredient thereof present, or for some other purpose. More particularly, for determining the quantity of an insecticide or pesticide residue in plant material, for example insecticides of the organic phosphtae ester group, the plant material is dissolved in a suitable solvent and in a diluent which is miscible in water, for example ethyl alcohol, and sample quantities or portions of the solution are placed in alternate containers 24 in the outer row of the holder 12 of the liquid supply apparatus 10, although it will be understood that the samples of plant material containing the insecticide may be placed in the inner row of containers. The containers between each of the containers containing the plant material samples may contain a wash solution, for example a 25% water solution of ethyl alcohol.

The reagent whose action is inhibited or inactivated by the material being treated is placed in alternate containers 22 of the inner row of containers provided in holder 12 so that a pair of containers 22 and 24 containing the reagent and sample, respectively, will be on the same radial line for simultaneous withdrawal of the liquids from said pair of containers. In the treatment for the phosphate ester insestice residue, the reagent is a solution of cholinesterase whose action is inhibited by the insecticide in proportion to the quantity of the insecticide present. Purified bovine erythrocyte acetylcholinesterase may be used and a water solution containing 100 units of the acetylcholinesterase per ml. is placed into said alternate containers 22. Since proteinaceous material is removed from the system by the dialyzer of the apparatus, other sources of cholinesterase may be used as substitutes for the purified material, if desired. The smaller containers 22 between each of the containers containing the cholinesterase reagent may contain a wash liquid, for example distilled water.

From the foregoing, it will be seen that as the liquid supply apparatus 10 is operated, a pair of containers 24, 22 is moved to the liquid take-off device 26 and the sample and reagent are aspirated simultaneously from their respective containers by the action of proportioning pump 84 and flow as separate streams through conduits 86 and 88, respectively, each of said conduits being connected, in fluid flow communication, to intake tubes 28 and 30, respectively. After the succeeding pair of containers 24, 22 containing the alcohol and water washes, respectively, are moved to the liquid take-off device, the washes are aspirated simultaneously into their respective conduits 86 and 88 so that a wash segment is provided between each of the aspirated sample and reagent segments and each wash segment is separated from the sample or reagent segment by an intervening segment of air, since the pump is operated continuously and aspirates air into conduits 86 and 88 when take-off tubes 28 and 30 are out of the liquids in the containers during rotational movement of the holder 12. The wash liquid segments and the air segments between the sample and reagent segments help keep the tubing of the apparatus clean and prevent carry-over or contamination of one sample by another.

Concurrently with the aspiration of the liquids from the containers and the formation of the sample stream in conduit 86 and the cholinesterase reagent stream in conduit 88, and the transmission of said streams through pump tubes 90 and 92, respectively, a solution of dilute bromine water is supplied to pump tube 94 and a solution of a dilute buffer reagent is supplied to pump tube 96 and an inert gas or air is supplied to pump tubes 98 and 100. The buffer reagent is a one liter solution of distilled water containing 0.40 gm. of sodium barbital, 0.04 gm. of potassium dihydrogen phosphate and 12.0 gms. of sodium chloride, and one liter solution being diluted with distilled water in the proportion of one part of buffer solution to four parts of distilled water. The dilute buffer reagent functions to maintain the pH of the insecticide sample and cholinesterase reagent constant. The dilute bromine water may be a 0.05 ml. quantity of saturated bromine water diluted to 100 ml. The bromine water oxidizes the insecticide sample and increases the inhibiting action of the insecticide on the cholinesterase reagent, thereby increasing the sensitivity of the system. Distilled water may be used as a diluent instead of bromine water, particularly with some insecticides of the group that are, in themselves, inhibitors and do not have any enhanced effect due to the bromine.

The streams in pump tubes 90, 98, and 94 are transmitted by the action of pump 84 to a fitting 102 where they join each other. More particularly, the sample insecticide segments flowing in pump tube 90 are divided into liquid segments consisting of insecticide and bromine water separated from each other by intervening segments of air from pump tube 98. The air functions to help cleanse the inner walls of the tubes through which the stream flows. Similarly, the alcohol wash segments between the sample insecticide segments are also divided into liquid segments consisting of alcohol and bromine water separated by intervening air segments. The segmented fluid stream is transmitted from the fitting 102 to a helical mixing coil 104 wherein the various constituents of the liquid segments of the segmented stream are mixed.

Similarly, the streams in pump tubes 92, 100 and 96 are transmitted by the action of the pump 84 to a fitting 106 where they join each other, in a similar manner as just described. More particularly, the cholinesterase segments flowing in pump tube 92 are divided into liquid segments consisting of cholinesterase and dilute buffer reagent separated from each other by intervening segments of air from pump tube 100. Similarly, the water wash segments between the cholinesterase sample segments in pump tube 92 are also divided into liquid segments consisting of water and dilute buffer reagent separated by intervening air segments. The segmented fluid stream is transmitted from the fitting 106 to a helical mixing coil 108 where the constituents of the liquid segments of the segmented stream are mixed.

The segmented stream from mixing coil 104 containing the insecticide and the segmented stream from mixing coil 108 containing the cholinesterase are simultaneously transmitted through conduits 110 and 112, respectively, to a mixing coil 114 for mixing the sample insecticide segments with the cholinesterase reagent segments. In order to preclude any dilution of the cholinesterase by the mixing thereof with the alcohol wash between samples of insecticide, the lengths of conduit 86 and 88 are adjusted to assure that corresponding portions of insecticide sample and cholinesterase reagent simultaneously aspirated from a pair of containers 24, 22, respectively, reach fitting 116 simultaneously and that corresponding portions of each of the segmented streams in conduits 110 and 112 join at fitting 116. More particularly, conduits 86 and 88 which connect take-off tubes 28 and 30, respectively, to pump tubes 90 and 92, respectively, are of equal diameters as are the take-off tubes. However, pump tube 90 is larger in diameter than pump tube 92 and, therefore, the pumping rate through pump tube 90 and conduit 86 is greater than the pumping rate through pump tube 92 and conduit 88. Accordingly, in order to assure that the simultaneously aspirated insecticide and reagent quantities reach their pump tubes 90 and 92, respectively, at the same time, the insecticide flows through a longer path than the reagent since the insecticide rate of flow is greater than the reagent rate of flow and the ratio of the path lengths is directly proportional to the rates of flow. For example, where the rate of flow of the insecticide is 0.60 ml./min. and where the rate of flow of the cholinesterase reagent is 0.42 ml./min., the length of conduit 88 is 0.42/0.60 or approximately two-thirds of the length of conduit 86. Since the total quantity of fluids supplied to pump tubes 90, 98 and 94 is the same as the total quantity of fluids supplied to pump tubes 92, 100 and 96, no further adjustment in tube lengths is required. In this manner the correct quantity of cholinesterase will mix with the correct quantity of insecticide in mixing coil 114 for the inhibiting action of the insecticide on the cholinesterase.

From mixing coil 114, the segmented stream comprising liquid segments containing insecticide, cholinesterase, dilute buffer, and dilute bromine water, separated from each other by intervening segments of air, are transmitted through conduit 118 to a temperature controlled heating bath 119 having a tubular coil 120 immersed therein. While in the heating bath the rate of the inhibiting or inactivating action of the insecticide on the cholinesterase increases and the degree of this inhibition is proportional to the quantity of the insecticide present.

The segmented fluid stream containing the inhibited and uninhibited cholinesterase is transmitted from the heating bath 119, through conduit 121, to a liquid supply device 122, wherein the air segments are removed from the stream and the liquid segments unite. A portion of the liquid in device 122 is aspirated therefrom as a stream by the action of proportioning pump 84A, via conduit 124, and the remaining portion of the liquid is discharged to waste, since only a portion of the liquid entering the supply device is utilized for colorimetric analysis. Concurrently with the transmission of the liquid stream containing the uninhibited and inhibited cholinesterase through pump tube 126, a buffer is supplied to pump tube 128, said buffer being the same as that supplied to pump tube 96, except that it is not diluted. An inert gas or air is supplied to pump tube 130. The streams are transmitted by the action of pump 84A to a fitting 132 where they join to form a segmented fluid stream consisting of liquid segments containing uninhibited and inhibited cholinesterase, the plant material solution containing the insecticide, dilute bromine water and dilute buffer reagent, separated from each other by intervening segments of air.

The segmented fluid stream is transmitted from fitting 132 to a helical mixing coil 134 wherein the constituents of the liquid segments of the fluid stream mix with each other. From mixing coil 134, the fluid stream is transmitted to a fitting 136 where it joins a stream of acetylcholine iodide supplied to pump tube 138 and transmitted by the action of the pump 84A to fitting 136, via conduit 140. The acetylcholine iodide is a solution obtained by dissolving 20 gms. of the acetylcholine in one liter of water. The acetylcholine is mixed in mixing coil 142 with the constituents of the liquid segments of the segmented fluid stream from mixing coil 134 and the fluid stream is transmitted from said mixing coil 142, via conduit 144, to a temperature controlled heating bath 146 containing a tubular coil 148 immersed therein. In the heating bath the uninhibited or active cholinesterase contained in the liquid segments of the segmented fluid stream breaks down the acetylcholine into acetic acid and choline and the extent of the reaction is indicative of the quantity of uninhibited cholinesterase present in the liquid segments of the stream. The reacted stream containing the acetic acid is transmitted from the heating bath to a dialyzer 150, at one side of the membrane 152 thereof, via conduit 154 and helical coil 156, respectively. The dialyzer and coil 156 are immersed in a temperature controlled heating bath 158 for maintaining constant temperatures during dialysis.

Concurrently with the transmission of the segmented fluid stream containing the acetic acid to the dialyzer, a recipient stream is also transmitted to the dialyzer at the other side of the membrane 152 thereof. More particularly, a solution of phenol red WS reagent is supplied to pump tube 160, an inert gas or air is supplied to pump tube 162 and a solution of sodium chloride is supplied to pump tube 164 and each stream of fluid is transmitted by the action of pump 84A to fitting 166 where they join to form a segmented fluid stream consisting of liquid segments containing the phenol red color reagent and sodium chloride separated from each other by intervening segments of air. The phenol red WS reagent solution is made by dissolving 0.225 gms. thereof in one liter of water and the sodium chloride solution is made by dissolving 100 gms. thereof in one liter of water. The color reagent segmented stream is transmitted to mixing coil 168 where the phenol red and sodium chloride constituents of the liquid segments mix and from said mixing coil the stream is transmitted to the dialyzer, via conduit 170 and helical coil 172, which is also immersed in the heating bath 158.

As the stream containing the acetic acid flows through the dialyzer, portions of the acid will diffuse through the membrane 152 into the recipient stream flowing through the dialyzer, at the other side of the membrane thereof, to form a diffusate segmented fluid stream consisting of liquid segments containing acetic acid, sodium chloride and the phenol red color reagent separated by intervening segments of air. Any proteinaceous material or chromogenic plant material or other interfering material present in the stream flowing in conduit 154 is held back by the dialyzer membrane, but the acetic acid readily diffuses through the membrane. In this regard the sodium chloride provides a concentrated recipient stream which helps the diffusion of the acetic acid. The undiffused fluids are discharged from the dialyzer through outlet 174 and the diffusate segmented fluid stream is transmitted to a colorimeter 174, of the flow cuvette type, via conduit 176, which operates a recorder 178. After passing through the colorimeter the diffusate liquid is discharged through outlet 179. The amount of the change in the color of the phenol red reagent by the acetic acid is indicative of the amount of the acetic acid present and such color change is thus an indication of the quantity of the insecticide present in the samples of the plant material. Since the colorimeter-recorder are well known devices and do not, per se, form part of the invention, a detailed description of either device is considered unnecessary.

The previously mentioned liquid supply device 122 is preferably of the type shown in the copending application of Andres Ferrari, Serial No. 799,884, filed March 17, 1959, which is owned by the assignee of the present invention. As best seen in FIG. 6, the device is preferably made of glass and has a vertically extending tubular inlet part 180, a vertically extending tubular discharge part 182, and an intermediate tubular part 184 providing a chamber for the liquid. A reflexed part 186 interconnects the lower ends of inlet part 180 and tubular part 184, and an aspirating tube 188 is connected to tubular part 184 at the upper end thereof with the lower end of said tube 188 being disposed below the dam part 190 connecting the discharge part 182 with intermediate part 184. Inlet part 180 is open at its upper end to the atmosphere and is provided with a nipple part 192 which is connected to conduit 121. The upper end of aspirating tube 188 is connected to conduit 124. From the foregoing it will be seen that the segmented fluid stream flowing in conduit 121 enters the liquid supply device 122, via nipple 192, and flows into inlet part 180 wherein the inert gas or air segments of the stream are vented to atmosphere through the upper open end of said inlet part and the liquid segments of the stream unite and collect at the bottom of said inlet part. From the inlet part the liquid flows through reflexed part 186 to the chamber of part 184 and a portion of the liquid is aspirated therefrom through tube 188 via the action of proportioning pump 84A. The excess liquid is discharged through part 182. It will be noted that the lower end of aspirating tube 188 is below the level of the liquid in the chamber of part 184, thereby precluding the admission of air into conduit 124.

The pumps 84 and 84A are preferably of the type shown in U.S. Patent No. 2,893,324, issued July 7, 1959. Briefly described, the pumps include a plurality of resilient flexible tubes, such as those indicated by reference numerals 90, 98, 94, 92, 100 and 96 in the case of pump 84, for example. The pump tubes are compressed against a platen simultaneously along their lengths by a set of rollers which are mounted for movement longitudinally of the pump tubes whereby proportional quantities of the fluids in the tubes are pumped. The tubes have internal diameters which may vary but the tubes have the same wall thickness so that they are compressed simultaneously against the platen irrespective of the internal diameters of the tubes and various quantities of fluids are pumped depending upon the internal diameters of the tubes and the linear speed of the rollers. Since the pumps do not, per se, form part of the invention and since any suitable pumps may be used, a detailed description of the pumps is unnecessary.

The dialyzer 150 is preferably of the type shown in U.S. Patent No. Re. 24,736, reissued November 17, 1959. Since the dialyzer also does not, per se, form part of the invention, a detailed description of the dialyzer is considered unnecessary.

A preferred but non-limitative example of the rates of flow of the various fluids in their respective conduits is as follows: the plant material solution containing the insecticide sample is pumped through tube 90 at the rate of 0.60 ml. per minute; the air is pumped through tube 98 at the rate of 0.32 ml. per minute; the dilute bromine water is pumped through tube 94 at the rate of 0.42 ml. per minute; the cholinesterase reagent solution is pumped through tube 92 at the rate of 0.42 ml. per minute; the air is pumped through tube 100 at the rate of 0.32 ml. per minute; the dilute buffer reagent is pumped through tube 96 at the rate of 0.60 ml. per minute; the liquid stream is aspirated from liquid supply device 122 at the rate of 1.20 ml. per minute; the air is pumped through tube 130 at the rate of 1.20 ml. per minute; the buffer solution is pumped through tube 128 at the rate of 1.20 ml. per minute; the acetylcholine iodide solution is pumped through tube 138 at the rate of 0.80 ml. per minute; the phenol red color reagent is pumped through tube 160 at the rate of 0.60 ml. per minute; the air is pumped through tube 162 at the rate of 1.60 ml. per minute; and the sodium chloride solution is pumped through tube 164 at the rate of 3.90 ml. per minute. It will be seen from the foregoing, as previously mentioned, that the total quantity of the fluids flowing in pump tubes 90, 98 and 94 is the same as the total quantity of the fluids flowing in pump tubes 92, 100 and 96.

Thus it will be seen that the method and apparatus of the present invention are well suited to accomplish the objects set forth. It will be understood that the invention may be used to determine the residue of an insecticide or pesticide in plant material of the edible type for example, but without limitation, fruits, vegetables, etc., and may also be used to determine insecticide or pesticide residues in other foods, for example in milk.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. Feed apparatus for supplying a series of liquid samples to an analysis apparatus, comprising a holder for a series of liquid sample receptacles arranged in a row, at least one additional receptacle positioned laterally of said row of receptacles for supplying a wash liquid, a liquid take-off device for the transmission of the samples, in succession, from their respective receptacles to said analysis apparatus and for the transmission of said wash liquid from its receptacle to said analysis apparatus between successive transmissions of samples thereto, means mounting said take-off device laterally outwardly of said holder for movement from a retracted position in relation to said holder to an operative position for the withdrawal of the liquid samples and said wash liquid from their respective receptacles, said take-off device having inlet means which is positioned in said receptacles in said operative position of said take-off device, said holder and said take-off device being relatively movable in one direction to position said inlet means of said take-off device in said receptacles for the samples and wash liquid transmission operation and in an opposite direction following said sample and wash liquid transmission operation, said holder and said take-off device being also relatively movable in the direction of the row of said sample receptacles, means for intermittently moving said holder and said take-off device in relation to each other in said direction of the row of receptacles to relative positions for the sample-transmission operation from each of said sample receptacles, and means operatively connected to said take-off device to urge and positively move the latter from said retracted position to said operative position for the withdrawal of said samples from their respective receptacles during each of a plurality of dwell periods of said holder and said take-off device during said intermittent relative movement thereof and for the withdrawal of said wash liquid from its receptacle.

2. Feed apparatus for supplying a series of liquid samples to an analysis apparatus, comprising a holder for a series of liquid sample receptacles arranged in a row, at least one additional receptacle positioned laterally of said row of receptacles for supplying a wash liquid, a liquid take-off device for the transmission of the samples, in succession, from their respective receptacles to said analysis apparatus and for the transmission of said wash liquid from its receptacle to said analysis apparatus between successive transmissions of samples thereto, means for removably positioning said holder in the feed apparatus in relation to said take-off device, means mounting said take-off device laterally outwardly of said holder for movement from a retracted position in relation to said holder to an operative position for the withdrawal of the liquid samples and said wash liquid from their respective receptacles, said take-off device having inlet means which is positioned in said receptacles in said operative position of said take-off device, said holder and said take-off device being relatively movable in one direction to position said inlet means of said take-off device in said receptacles for the samples and wash liquid transmission operation and in an opposite direction following said sample and wash liquid transmission operation, said holder and said take-off device being also relatively movable in the direction of the row of said sample receptacles, means for intermittently moving said holder and said take-off device in relation to each other in said direction of the row of receptacles to relative positions for the sample-transmission operation from each of said sample receptacles, and means operatively connected to said take-off device to urge and positively move the latter from said retracted position to said operative position for the withdrawal of said samples from their respective receptacles during each of a plurality of dwell periods of said holder and said take-off device during said intermittent relative movement thereof and for the withdrawal of said wash liquid from its receptacle, said last mentioned means being also operable for moving said take-off device automatically from said operative position to said retracted position thereof.

3. Feed apparatus for supplying a series of liquid samples and a liquid reagent therefor simultaneously to an analysis apparatus, comprising a holder for a series of liquid sample receptacles arranged in a row and for another series of liquid reagent receptacles arranged in another row, a liquid take-off device for the transmission of the samples, in succession, from their respective receptacles to said analysis apparatus and for the simultaneous and separate transmission of the liquid reagent, in succession, from their respective receptacles to said analysis apparatus, means mounting said take-off device laterally outwardly of said holder for movement from a retracted position in relation to said holder to an operative position for the simultaneous withdrawal of the liquid samples and said reagent from their respective receptacles, said takeoff device having separate inlet tubes which are simultaneously positioned in a sample receptacle and in a companion reagent receptacle, respectively, in said operative position of said take-off device, said holder and said take-off device being relatively movable in one direction to simultaneously position said inlet tubes of said take-off device in said sample receptacle and companion reagent receptacles, respectively, for the sample and reagent transmission operation and in an opposite direction following said sample and reagent transmission operation, said holder and said take off device being also relatively movable in the direction of the row of said sample receptacles, means for intermittently moving said holder and said take-off device in relation to each other in said direction of the row of said sample receptacles to relative positions for the sample and reagent transmission operation from each of said sample receptacles and their companion reagent receptacles, and means operatively connected to said take-off device to urge and positively move the latter from said retracted position to said operative position for the simultaneous withdrawal of said samples and reagent from their respective receptacles during each of a plurality of dwell periods of said holder and said take-off device during said intermittent relative movement thereof, said last mentioned means being also operable for moving said take-off means automatically from said operative position to said retracted position thereof.

References Cited in the file of this patent

UNITED STATES PATENTS

| | | |
|---|---|---|
| 2,604,249 | Gorham | June 22, 1952 |
| 2,710,715 | Gorham | June 14, 1955 |
| 2,879,141 | Skeggs | Mar. 24, 1959 |
| 2,899,280 | Whitehead | Aug. 11, 1959 |

OTHER REFERENCES

Giang: Anal. Chem., vol. 23, December 1951, pages 1830–1834.